United States Patent [19]

Langpape

[11] 4,452,870
[45] Jun. 5, 1984

[54] ELECTROCHEMICAL STORAGE CELL

[75] Inventor: Reinhart Langpape, Schönau-Altneudorf, Fed. Rep. of Germany

[73] Assignee: Brown, Boveri & Cie A.G., Mannheim-Käfertal, Fed. Rep. of Germany

[21] Appl. No.: 431,612

[30] Foreign Application Priority Data

Oct. 21, 1981 [DE] Fed. Rep. of Germany ........ 3141697

[22] Filed: Sep. 30, 1982

[51] Int. Cl.$^3$ ........................................... H01M 10/39
[52] U.S. Cl. ............................................ 429/104
[58] Field of Search ....................................... 429/104

[56] References Cited

U.S. PATENT DOCUMENTS 3,939,007 2/1976 Sudworth et al. ................... 429/104
4,226,922 10/1980 Sammells ............................ 429/104

FOREIGN PATENT DOCUMENTS 54-102524 8/1979 Japan .................................. 429/104

Primary Examiner—Donald L. Walton
Attorney, Agent, or Firm—Herbert L. Lerner; Laurence A. Greenberg

[57] ABSTRACT

The invention relates to an electrochemical storage cell on the basis of alkali metal and chalcogen, particularly sodium and sulfur. The storage cell has an anode space for receiving the anolyte and a cathode space for receiving the catholyte. The two spaces are separated from each other by a cup-shaped solid electrolyte. The solid electrolyte is surrounded in the region of the anode space by a capillary structure over the entire length. The capillary structure has at least one widened portion which is formed by an outward-pointing bulge of the capillary structure. The widened portion extends over the entire length of the capillary structure. Each widened portion is traversed in its interior by a canal. The cylinder surface of this canal is formed by a metal screen. The entrance opening of this canal is directly adjacent to the exit opening of a supply container for the sodium.

17 Claims, 1 Drawing Figure

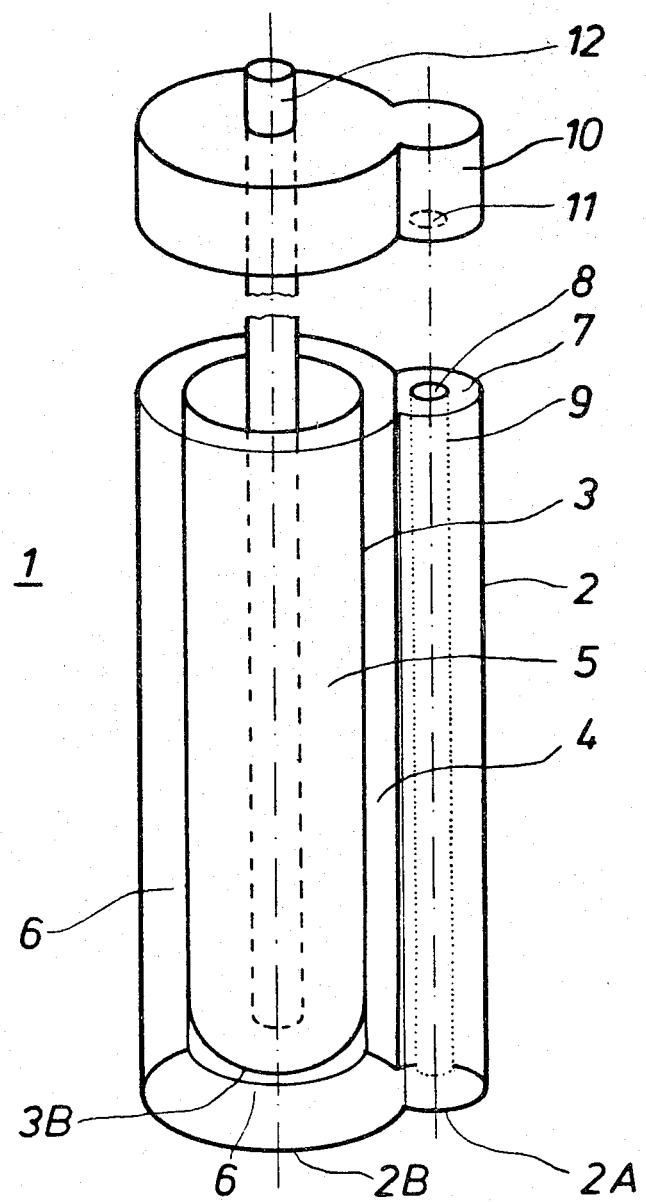

ELECTROCHEMICAL STORAGE CELL

BACKGROUND OF THE INVENTION

1. Field of the Invention

The invention relates to an electrochemical storage cell of the alkali-metal and chalcogen type with at least one anode space for receiving the anolyte and a cathode space for receiving the catholyte, which are separated by an alkali ion-conducting solid electrolyte. The electrolyte is surrounded in the region of the anode space by a capillary structure at least over the entire surface utilized for the chemical reaction.

2. Description of the Prior Art

Such rechargeable electrochemical storage cells with a solid electrolyte are highly suited for constructing storage batteries with high energy and power density. The solid electrolytes used in the alkali/chalcogen storage cells, which are made, for instance, of $\beta$-aluminum oxide are characterized by the feature that the partial conductivity of the mobile ion is very high and the partial conductivity of the electrons is many powers of ten lower. By using such solid electrolytes for constructing electrochemical storage cells, practically no self-discharge takes place, since the electron conductivity is negligible and their reaction substances, as neutral particles, also cannot get through the solid electrolyte.

A specific example for such rechargeable electrochemical storage cells are those of the sodium/sulfur type which have a solid electrolyte of $\beta$-aluminum oxide. It is an advantage of these electrochemical storage cells that no secondary electrochemical reactions occur during the charging. The reason for this is again that only sodium ions can get through the solid electrolyte. The current yield of such a sodium/sulfur cell is therefore nearly 100%. In these electrochemical storage cells, the ratio of energy content to total weight of such a storage cell is very large as compared to lead storage cells, since the reaction materials are light and much energy is released in the electrochemical reaction. Electrochemical storage cells on the basis of sodium and sulfur therefore have considerable advantages over conventional storage batteries such as lead storage batteries.

To ensure optimum operation of these sodium/sulfur storage cells, there must be assurance that these storage cells have a low internal resistance. To achieve this in sodium/sulfur storage cells, it is necessary that the solid electrolyte is wetted or covered on both sides by one of the two reactants without a gap.

In German Pat. No. 24 00 202, an electrochemical storage cell is described which has a cup-shaped solid electrolyte, the interior of which serves as the anode space. An alloy steel fabric is placed in the interior of the solid electrolyte. Between the surface of the fabric and the solid electrolyte, a capillary region which extends up into the supply vessel of the alkali metal is created by this measure. The capillary structure formed thereby causes distribution of the alkali metal over the entire active surface of the solid electrolyte on the anode side.

A disadvantage of this arrangement is that the transport of the alkali metal from the supply vessel to the solid electrolyte surface and from there back to the supply vessel can take place only within the capillary structure. With increasing age of the storage cell, the danger exists here that the transporting action of the capillary structure is decreased by impurities. Thereby, the surface wetting of the solid electrolyte is reduced, which can cause a rise in the internal resistance of the storage cell and therefore, diminished operability thereof.

SUMMARY OF THE INVENTION

It is therefore an object of the invention to provide a sodium/sulfur storage cell in which an optimum transport of the sodium from the supply vessel to the surface of the solid electrolyte and back is permanently assured and uninterrupted wetting of the entire electrolyte surface in the area of the anode space can be maintained with increasing age of the storage cell.

With the foregoing and other objects in view, there is provided in accordance with the invention an electrochemical storage cell of the alkali metal and chalcogen type with at least one anode space for the anolyte and a cathode space for the catholyte, with the anode and the cathode spaces separated from each other by an alkali ion-conducting solid electrolyte, and with the solid electrolyte surrounded in the region of the anode space by a capillary structure at least over the surface of the electrolyte on the anode side utilized for the electrochemical reaction, the combination therewith of the capillary structure having at least one widened portion with at least one canal through the widened portion, said canal in communication with the capillary structure at least in some regions via at least one opening.

Other features which are considered as characteristic for the invention are set forth in the appended claims.

Although the invention is illustrated and described herein as embodied in an electrochemical storage cell, it is nevertheless not intended to be limited to the details shown, since various modification may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 1 diagrammatically illustrates an inverted sodium/sulfur storage cell in a vertical section, and in particular a convex bulge of the capillary material surrounding the electrolyte. A canal traverses the bulge. The canal has an opening adjacent a sodium supply container with the sodium flowing from the canal through a screen into the capillary material.

DETAILED DESCRIPTION OF THE INVENTION

In accordance with the invention, the capillary structure in a sodium/sulfur storage cell of the type mentioned at the outset has at least one widened portion through which at least one canal goes which is in communication at least in some places with the capillary structure via at least one opening.

Each widening of the capillary structure is formed by a bulge of the capillary structure pointing away from the solid electrolyte. The canal which goes through the widened portion is preferably arranged in the center of the widened portion. The canal is hollow with its inside boundary formed by a metal screen. The canal extends over the entire length of the widened portion. Each widening of the capillary structure and the canal arranged therein are disposed so that the entrance opening of the canal is directly adjacent to the exit opening of the sodium supply container. According to the invention, the sodium flows from the supply container into the canal. It is transported in this canal along the entire solid electrolyte. Since the cylinder surface of the canal is formed by a metal screen, the sodium can flow out of the canal at any point and into the capillary structure and get from there to the surface of the solid electrolyte. Thereby, every point on the surface of the solid electrolyte is wetted permanently by the sodium. By using the canal, a larger amount of sodium can be transported continuously along the solid electrolyte. Clogging of the canal is practically impossible. Due to the numerous openings which the canal has, a sufficiently large amount of sodium can always penetrate into the capillary structure. Clogging the exit openings of the canal is likewise virtually impossible. The return of the sodium not needed to the supply container is likewise ensured by the canal. Thus, by virtue of the invention, the required amount of sodium is always available at the surface of the solid electrolyte. However, in the event the solid electrolyte breaks, it is also ensured that the confluence of large amounts of sodium and the sulfur is prevented, since, as already mentioned, only as much sodium is present at the surface of the solid electrolyte as is absolutely necessary for wetting the latter.

According to the invention, the capillary structure is surrounded by a support element. The support element is arranged on the side of the capillary structure facing away from the solid electrolyte. This support element rests closely against the capillary structure and extends over the entire length of the capillary structure. The support element is preferably tubular. Its cross section fits the cross section of the capillary structure. At the points where the capillary structure is widened, the support element has an outward-pointing bulge for receiving this widened portion. The bulge is shaped so that it surrounds the bulge of the capillary structure closely. The tube which forms the support element is preferably made of aluminum or an aluminum alloy.

If the anode space is in the interior of the solid electrolyte, the interior of the tube which is arranged as the support element around the capillary structure serves at the same time as the sodium supply container. If on the other hand, the anode space is located between the outer metal housing of the storage cell and the solid electrolyte, the support element is designed as a tube closed on one side which likewise surrounds the capillary structure closely. At the same time, this tube, closed on one side, serves in this embodiment as a metal housing of the storage cell. In this case, the tube is preferably made of an alloy steel.

In the following the invention will be explained with reference to the drawings.

The electrochemical storage cell 1 shown in FIG. 1 is an inverted sodium/sulfur storage cell formed substantially of a cup-shaped housing 2 and a solid electrolyte 3. The cup-shaped housing 2 is made of metal and is protected against corrosion. The solid electrolyte 3 is made of β-aluminum oxide. The solid electrolyte 3 is, likewise, cup-shaped and arranged in the interior of the metallic housing 2. The dimensions of the solid electrolyte 3 are chosen so that a continuous space 4 is formed between the outside surfaces of electrolyte 3 and the inside surfaces of the metallic housing 2, which in this embodiment serves as the anode space 4. The interior of the solid electrolyte 3 is utilized as the cathode space 5. It is filled with a graphite felt which is impregnated with sulfur. The space 4 formed between the metallic housing 2 and the solid electrolyte 3 serves as the anode space, as already mentioned above. The outside surface of the solid electrolyte is surrounded by a capillary structure 6. The latter rests closely against the solid electrolyte and extends over the entire length thereof. The widening 7 is formed by a convex bulge of the capillary material which points away from the solid electrolyte 3. A canal 8, parallel to the longitudinal axis of the storage cell 1, is arranged in the center of the bulge 7. The bulge 7 is traversed by the canal 8 along its entire length. The canal 8 is completely hollow on the inside. Its cylinder surface is formed by a metal screen 9. On the outside, the capillary structure 6 is surrounded by the metallic housing 2 of the storage cell 1. In this embodiment, the housing 2 assumes the function of the support element which surrounds the capillary structure 6. The cross section of the metallic housing 6 fits the cross section of the capillary structure 6. In particular, the metallic housing 2 likewise has an outward-directed bulge 2A at the point where the bulge 7 of the capillary structure 6 is located. The dimensions of this bulge 2A are designed so that it can accept the bulge 7 of the capillary structure 6 completely and rests against the former closely. Capillary-active material 6 is also arranged between the bottom 3B of the solid electrolyte and the bottom 2B. The solid electrolyte 3 is placed on this capillary-active material 6 and supported there. The thickness of the capillary-active material 6 which is arranged between the bottom 3B of the solid electrolyte 3 and the metallic housing 2 is chosen so that the upper end of the solid electrolyte lies approximately in one plane with the upper end of the metallic housing 2. Thereby, a secure seal of the entire storage cell against the outside and the two reactant spaces against each other can be achieved. The seal of the storage cell 1 is not shown in the embodiment example schematically drawn here. Also, this is not a feature essential to the invention.

The storage cell 1 shown in FIG. 1 additionally contains a supply container 10 for the sodium, which is arranged above the storage cell 1 proper. It forms at the same time the seal of the storage cell 1 from the outside and is therefore firmly connected thereto. The cross section of the supply container is adapted to the cross section of the metallic housing 2. It is a substantially completely closed container which has an exit opening 11 for the sodium only in the vicinity of the anode space 4. This exit opening 11 is arranged so that it is on top of the entrance opening of the canal 8. The widened portion 7, and in particular the bulge of the capillary structure 6, is brought upward so far that the canal arranged in its center is directly adjacent to the supply container 10. In addition to the capillary structure 6, the anode space 4 contains the sodium which serves as the anodic reactant. During the discharge of the storage cell, part of this sodium which is container in the anode space 4, is consumed. In order that the surface of the solid electrolyte 3 is wetted always and without interruption by the sodium, the latter is replenished from the supply container 10, replacing the consumed amount. The sodium is transported from the supply container 10 via the canal 8. As already mentioned above, the cylinder surface of the canal 8 is formed by a metal screen 9. The latter has so many openings that sodium can flow from the canal into the capillary structure everywhere. It is ensured thereby that every point on the surface of the solid electrolyte is always wetted by sodium. The metallic housing 2 serves as the anodic current collector. The function of the cathodic current collector is assumed by a metal rod 12 which goes through the supply container and extends deeply into the interior of the solid electrolyte 3. The current collector 12 is insulated electrically from the supply container 10 in the region of the latter. The metal rod 12 is arranged so that it protrudes slightly beyond the supply container 10.

Another embodiment of the electrochemical storage cell 1 is a normal storage cell in which the anode space is located inside the solid electrolyte. The cell is formed by a cup-shaped housing 2 and a likewise cup-shaped solid electrolyte 3. The cup-shaped housing 2 is made of metal. The solid electrolyte 3 is made of $\beta$-aluminum oxide. The interior of the solid electrolyte 3 serves as the anode space 4. The dimensions of the solid electrolyte 3 are chosen to form a space 5, uninterrupted all around between the inside surfaces of the metallic housing 2 and the outside surfaces of the solid electrolyte 3. In this embodiment example, this space serves as the cathode space. The solid electrolyte 3 is connected at its upper end to an insulator. The insulator is preferably fastened to the solid electrolyte 3 via a glass solder. The insulator is designed so that it protrudes outward beyond the solid electrolyte 3 and forms a flange. The insulator is preferably made of $\alpha$-aluminum oxide. The metallic housing 2 is provided at its upper end with an outward-pointing flange. The insulator connected to the solid electrolyte 3 is placed on and supported by the flange. Between the insulator and the flange, an additional seal (not shown here) is preferably arranged. As already mentioned above, the anode space 4 is arranged in the interior of the solid electrolyte 3. A capillary structure 6 firmly rests against the inside boundary surfaces of the solid electrolyte 3. The capillary structure 6 has in this embodiment two widened portions; elsewhere, it has substantially the same thickness. The two widened portions are bulges of the capillary structure 6. The two bulges point toward the interior of the solid electrolyte 3. The two bulges extend over the entire length of the capillary structure 6. The latter, in turn, is arranged from the upper to the lower end of the solid electrolyte 3. One bulge has a U-shaped cross section. The other bulge is designed so that it has a cylindrical cross section. Both bulges have a canal 8 in their interior. Both canals 8 extend over the entire length of the widened portions. They are parallel to the longitudinal axis of the storage cell 1. Also, in this embodiment example, both canals 8 are completely hollow inside. Their cylinder surfaces are formed by a metal screen 9 each.

The purpose of the two canals 8 is to transport the sodium from the supply container 10 to along the entire solid electrolyte 3. The canals' cylinder surfaces are formed by a metal screen 9 which have a sufficient number of openings through which sodium can flow from the canals 8 into the capillary structure 6. The sodium is conducted from structure 6 to the surface of the solid electrolyte 3. The sodium is returned in the reverse manner. The shape of the bulges has no influence on the transport of the sodium within the canals. Rather, it is shown by way of the different embodiments of the bulges that the widened portions of the capillary structure 6 are not tied to a particular embodiment, but can be adapted to a particular situation if required. Also in the embodiment example shown here, the capillary structure 6 is surrounded by a support element on the side pointing away from the solid electrolyte 3. The support element is tubular. In the region of the two bulges, the support element also has bulges which are facing the interior of the solid electrolyte 3. The form of these bulges is matched to the form of the first mentioned bulges, so that they can accept the former and surround them firmly. The remaining portion of the support element is likewise designed so that it rests firmly against the capillary structure 6. The length of the support element is designed so that it extends over the entire length of the capillary structure 6. The support element is made of aluminum or an aluminum alloy, is protected against corrosion and, as already mentioned, is tubular. The interior of the support element serves in the embodiment example shown here as the supply container 10 for the sodium. The support element is brought up to the upper end of the solid electrolyte 3. A narrow empty space is provided between the bottom 3B of the solid electrolyte 3 and the lower end of the support element. Directly adjacent to this space are the entrance openings of the two canals 8, so that the sodium is conducted from the supply container 10 directly into the canals 8.

The seal of the storage cell 1 is formed by a cover plate which lies on the insulator and is firmly connected thereto. Preferably, a seal (not shown here) is also arranged between the insulator and the cover plate.

In this embodiment, the metallic housing 2 serves as the cathodic current collector. The anodic current collector is formed by a metal rod which extends far into the interior of the solid electrolyte 3. It goes through the cover plate, to which it is connected via insulation (not shown here). The metal rod is arranged so that it protrudes beyond the cover plate by a few millimeters.

I claim:

1. Electrochemical storage cell of the alkali metal and chalcogen type with at least one anode space for the anolyte and a cathode space for the catholyte with the anode and the cathode spaces separated from each other by an alkali ion-conducting solid electrolyte, and with the solid electrolyte surrounded in the region of the anode space by a capillary structure at least over the surface of the electrolyte on the anode side utilized for the electrochemical reaction, the combination therewith of the capillary structure having at least one widened portion with at least one canal through the widened portion, said canal in communication with the capillary structure at least in some regions via at least one opening.

2. Electrochemical storage cell according to claim 1, wherein the alkali metal is sodium and the chalcogen is sulfur.

3. Electrochemical storage cell according to claim 1, wherein each widened portion of the capillary structure is formed by a bulge of the capillary structure pointing away from the surface of the solid electrolyte.

4. Electrochemical storage cell according to claim 1, wherein each canal is arranged in the center of the widened portion.

5. Electrochemical storage cell according to claim 1, wherein each canal has a cylinder surface formed by a corrosion-resistant metal screen.

6. Electrochemical storage cell according to claim 1, wherein each widened portion extends at least over the entire length of the solid electrolyte utilized for the electrochemical reaction.

7. Electrochemical storage cell according to claim 5, wherein each canal extends over the entire length of the widened portion.

8. Electrochemical storage cell according to claim 1, wherein the capillary structure is surrounded by at least one support element on the side facing away from the solid electrolyte.

9. Electrochemical storage cell according to claim 8, wherein each support element is shaped as a tube.

10. Electrochemical storage cell according to claim 9, wherein the cross section of the support element is adapted to the outside cross section of the capillary structure.

11. Electrochemical storage cell according to claim 9, wherein the cross section of the support element is adapted to the inside cross section of the capillary structure.

12. Electrochemical storage cell according to claim 8, wherein the support element has at least the same length as the capillary structure.

13. Electrochemical storage cell according to claim 11, wherein sodium is the alkali metal, and wherein the interior of the support element forms the supply container for the sodium.

14. Electrochemical storage cell according to claim 8, wherein the support element is made of aluminum or an aluminum alloy.

15. Electrochemical storage cell according to claim 10, wherein the support element is formed by the metallic housing of the storage cell.

16. Electrochemical storage cell according to claim 10, wherein the support element is made of steel.

17. Electrochemical storage cell according to claim 8, wherein the support element is provided with corrosion protection.

* * * * *